US006961587B1

(12) United States Patent
Vilppula et al.

(10) Patent No.: US 6,961,587 B1
(45) Date of Patent: Nov. 1, 2005

(54) STORAGE MEDIA

(75) Inventors: Matti Vilppula, Pirkkala (FI); Vesa Tervo, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/569,169

(22) Filed: May 11, 2000

(30) Foreign Application Priority Data

May 11, 1999 (FI) ..................................... 991089

(51) Int. Cl.⁷ ............................. H04B 1/38; H04M 1/00
(52) U.S. Cl. ..................................... 455/558; 455/410
(58) Field of Search ............................. 455/344, 351, 455/557, 558, 517, 410, 411; 705/50, 64, 705/65, 66, 72; 717/100, 115

(56) References Cited

U.S. PATENT DOCUMENTS

| | | | | |
|---|---|---|---|---|
| 4,882,474 A | | 11/1989 | Anderl et al. ................ | 235/380 |
| 5,404,580 A | * | 4/1995 | Simpson et al. ............. | 455/558 |
| 5,465,401 A | * | 11/1995 | Thompson ................... | 455/558 |
| 5,659,890 A | * | 8/1997 | Hidaka ........................ | 455/344 |
| 5,901,303 A | * | 5/1999 | Chew .......................... | 711/115 |
| 5,907,616 A | * | 5/1999 | Brogger et al. .............. | 705/66 |
| 5,912,453 A | | 6/1999 | Gungl et al. ................. | 235/492 |
| 6,011,976 A | * | 1/2000 | Michaels et al. ............. | 455/466 |
| 6,141,563 A | * | 10/2000 | Miller et al. ................. | 455/558 |
| 6,415,160 B1 | * | 7/2002 | Wichmann ................... | 455/558 |
| 6,418,326 B1 | * | 7/2002 | Heinonen et al. ............ | 455/558 |
| 6,657,538 B1 | * | 12/2003 | Ritter .......................... | 455/411 |

FOREIGN PATENT DOCUMENTS

| | | |
|---|---|---|
| DE | 195 36 169 A1 | 4/1997 |
| EP | 0 262 025 | 3/1988 |
| WO | WO 98/32089 | 7/1998 |
| WO | WO 98/43212 | 10/1998 |
| WO | WO 98/52153 | 11/1998 |
| WO | WO 98/52158 | 11/1998 |
| WO | WO 98/52159 | 11/1998 |
| WO | WO 98/52160 | 11/1998 |
| WO | WO 99/38131 | 7/1999 |

OTHER PUBLICATIONS

"Smart Card Security And Applications", Mike Hendry, pp. 215-223.
"Handbuch der Chipkarten", Rankl, 1995, Hanser Verlag, pp. 99-103, (English translation included thereof).

* cited by examiner

Primary Examiner—Quochien B. Vuong
(74) Attorney, Agent, or Firm—Perman & Green, LLP.

(57) ABSTRACT

A smart card (24) for a mobile communications terminal (10) contains a plurality of application programs (60-68) providing various services. A number of different profiles are configured so that certain of the applications are accessible in certain of the profiles. The smart card is changed from one profile to another by changing application identification and selection data in a directory (70) of the applications.

32 Claims, 5 Drawing Sheets

STORAGE MEDIA

FIELD OF THE INVENTION

This invention relates to storage media and is particularly, but not exclusively, related to storage media used in communications devices and communications devices including such storage media. In one embodiment, it relates to storage media used in mobile communications devices such as mobile telephones.

BACKGROUND OF THE INVENTION

Mobile communications devices often contain smart cards. The smart cards are used to carry out particular processing tasks. Smart cards usually have memory means and processor means. The memory means often carries personal and/or secret data which can, for example, identify a particular user or enable access to services, data and otherwise secure locations. Smart cards are particularly suited to holding information securely because the information is stored in hardware. Hardware is more tamper-resistant than software.

A smart card and a device which is used to read it, for example a communications device, communicate by means of Application Protocol Data Units (APDUs). Commands sent to a smart card are sent in the form is a Command-APDUs (or C-APDUs) which may activate a response from a card. APDUs are defined in the relevant smart cards standards such as those issued by ISO/IEC. Command-APDUs are used in obtaining information from smart cards.

Generally smart cards can be removed from the devices in which they are used. An example of a smart card is a Subscriber Identity Module (SIM) card which is currently used in mobile telephones. Other types of SIM cards have been proposed, for example for third generation systems, such the Universal Mobile Telephone System (UMTS). Such third generation SIM cards are referred to as USIMs.

Modern communications devices, particularly mobile communications devices, are increasingly being used for a diverse range of activities in addition to conventional telephony. These activities include information gathering, particularly from the Internet, conducting transactions, such as the purchase of goods and/or services or using a banking service. Mobile and static communications devices exist which are not used for voice telephony but are primarily used for various types of data communication or exchange.

As communications devices are being used for a more diverse range of services, they need a variety of application programs to provide and interact with these services. Conveniently, application programs are stored on a storage medium in the communications devices, for example SIMs.

Since the services provided by the application programs are valuable it is desirable to restrict access so that they can only be accessed by authorised users. Access is usually restricted by means of a personal identification number code, a so-called PIN code, which needs to be input into the terminal to allow access to the relevant application program.

It has been proposed to provide a plurality of application programs for a communications terminal on the same storage medium and provide a separate PIN for each application program. A disadvantage of this approach is that a user of the plurality of application programs needs to remember or record a plurality of PIN codes.

WO 98/32089 proposes storing a number of different application programs on a SIM card for a communication terminal. It further proposes that a user in possession of several SIM cards can switch between them to use different applications in the communications terminal. Not only is it inconvenient for a user to carry around a number of SIM cards, but it is also inconvenient to exchange one for another in the communications terminal, especially since each will probably have associated with it its own PIN code. In can be difficult for a user to remember which PIN code corresponds to which SIM-card.

SUMMARY OF THE INVENTION

According to a first aspect of the invention there is provided a storage medium containing a plurality of application programs the application programs being grouped into a plurality of application program group selection means being provided to determine the application program groups to which a user has access.

The user may have access only to a single application program group. The user may have access to more than one application program group.

An advantage of the invention is that a user of the storage medium is able to select a plurality of application programs by using one application selection procedure, for example one card holder verification, and so needs fewer access codes, and possibly only one. Furthermore, it avoids the need to provide separate storage media to enable a user to obtain access to separate application program groups.

Preferably the selection means is an application program. Preferably the selection means enables a user to have access to the application programs of at least one particular application program group and not to the applications of at least one other particular application program group. However, certain users or certain classes of users may have access to all of the application program groups. In this way certain application programs, such as those allowing use of e-money, can be hidden from users not having access to them and also simply not be selectable by a user, for example via a user interface.

Preferably the application program groups have a degree of overlap with at least one particular application program being contained in more than one application program group.

Preferably the storage medium is insertable into and removable from a communications terminal. Preferably the storage medium is a smart card. It may be a SIM card.

If the application is applied to a SIM card, there is no need to change its communication protocol by adding new C-APDU commands. All that is required is simply to include the selection means.

Preferably the storage medium contains a directory which is up-dated when a user selects a particular application program group. Preferably it is up-dated to contain identifiers of application programs in the most recently selected application program group.

According to a second aspect of the invention there is provided an application program for selecting between a plurality of application program groups.

According to a third aspect of the invention there is provided a communications terminal comprising a storage medium, the storage medium containing a plurality of application programs the application programs being grouped into a plurality of application program groups group selection means being provided to determine the application program groups to which a user has access.

Preferably the communications terminal is mobile. Most preferably it comprises a mobile telephone.

According to a fourth aspect of the invention there is provided a method of selecting an application program group from a storage medium containing a plurality of application programs comprising the steps of:

grouping the application programs into a plurality of application program groups;

providing group selection means to determine the application program groups to which a user has access;

carrying out a verification procedure to confirm access to at least one of the application program groups; and allowing the user access to at least one of the application program groups.

At least one application program group may contain only one application program.

According to a fifth aspect of the invention there is provided a storage medium containing:

at least one application program;

a file structure having a plurality of data files at least some of the data files containing data for use in operation of the application program; and selection means to determine the data files which are used by the application program, in which the selection means is responsive to access information which is provided by a user and determines the data files which the application program uses on the basis of the access information.

Preferably the data files are elementary files.

According to a sixth aspect of the invention there is provided a method of selecting data files stored on a storage medium, the method comprising the steps of:

storing a file structure having a plurality of data files on the storage medium at least some of the data files containing data to be used in operation of an application program;

providing selection means to determine the data files which are to be used by the application program;

receiving access information from a user;

using the selection means to determine the data files which the application program is able to use on the basis of the access information.

Preferably the method also comprises the step of storing the application program on the storage medium.

Preferably the method also comprises the step of storing the selection means on the storage medium.

According to a seventh aspect of the invention there is provided a data transmission device having a storage medium, the storage medium containing:

at least one application program which is run by the data transmission device to carry out application tasks;

a file structure having a plurality of data files at least some of the data files containing data for use in operation of the application program; and selection means to determine the data files which are useable in operation of the data transmission device, in which the selection means is responsive to access information which is provided by a user and determines the data files which are useable in operation of the data transmission device on the basis of the access information.

According to an eighth aspect of the invention there is provided a method of selecting data files stored on a storage medium, the method comprising the steps of:

storing a file structure having a plurality of data files on the storage medium at least some of the data files containing data to be used in operation of an application program to carry out application tasks;

providing selection means to determine the data files which are to be involved in use of the storage medium;

receiving access information from a user;

using the selection means to determine the data files which are to be used by the storage medium on the basis of the access information.

The application program may be able to carry out different functions depending on the data files to which it has access. The accessible data files may enable it to provide telephony or data transfer services, for example GSM, UMTS and/or WAP services. The functions may not be restricted to one particular type of service, for example telephony or data transfer, but may include other services related to e-money or e-commerce.

In this way, an apparent file structure of data files which is presented as a result of a user providing first access information may be different to another apparent file structure of data files which is presented as a result of a user providing second access information. In this way, the file structure of data files which are accessible to an application program is modified to present different data files depending on the access information which the user provides.

In one embodiment of this aspect, there may be a plurality of application programs contained in the storage medium which use at least some data files in common. In this case, the access information may change the data files which are accessible to at least one of the application programs. This may involve reducing the number of data files to which the application program has access or determining that the application program has access to one particular data file of a certain type rather than another particular data file of that certain type.

The invention makes it possible to hide application programs so they are not visible to the user. If the storage medium is a SIM card this allows the provision of a plurality of application programs to provide services, only one or some of which are subscribed to by the user. If the user at a later time subscribes to another service, he can be provided with access to it, for example by a service provider giving the user a suitable password allowing access to a suitable profile.

Another situation in which the invention could be applied is if the user has different profiles for different kinds of use. For example, the user may have a profile which is used for work related matters and a profile which is used for private related matters. If the application programs relate to services for which payment is made, this provides a straightforward billing arrangement.

BRIEF DESCRIPTION OF THE DRAWINGS

An embodiment of the invention will now be described by way of example only with reference to the accompanying drawings in which.

DETAILED DESCRIPTION

Figure 1:
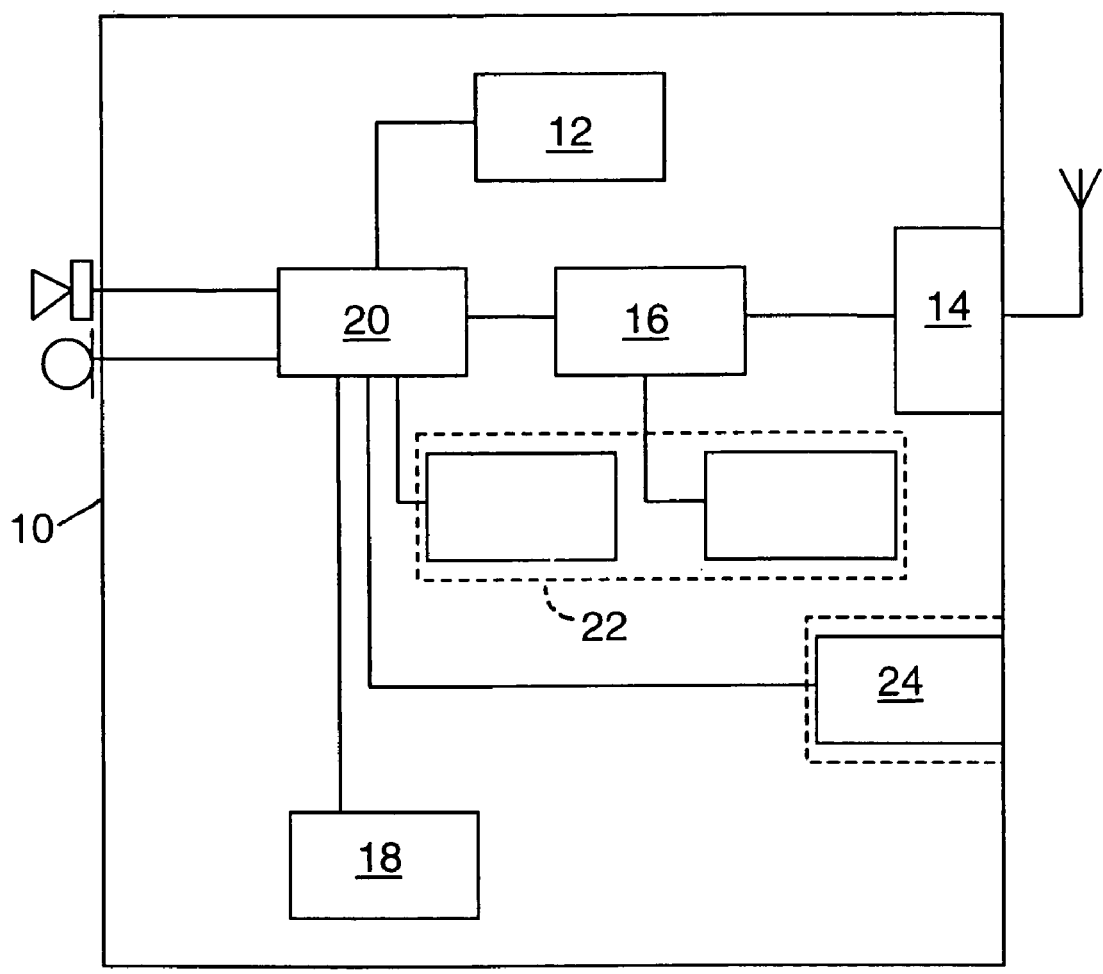
FIG. 1 shows a communication device.

FIG. 1 shows a mobile terminal 10 comprising a mobile telephone. The mobile terminal 10 comprises a display 12, transmission and receiving means 14 for transmitting and receiving radio signals, a digital signal processor (DSP) 16 for processing data and voice into and from the radio signals, a user input device such as a keypad or keyboard 18, a central processing unit (CPU) 20, the operation of which is controlled by an operating system program and memory means 22 for storing data and software to enable the device to operate. The memory means is used by the DSP 16 and the CPU 20. The mobile terminal also comprises a removable smart card such as a SIM card 24. The SIM card 24 contains a number of selectable application programs which enable the mobile terminal to use a number of services including, but not limited to, telecommunications applications. The SIM card 24 and the applications present on it will be described in more detail in the following.

If the terminal is available for use by a number of users, it may be desirable to provide different users with different levels of access, that is, for users to be able to access one, some or all of the services provided by the application programs. In this example, it may be desirable to prevent some users having access to an electronic money application program and to certain levels of communication application programs such as telecommunications services.

Figure 2:
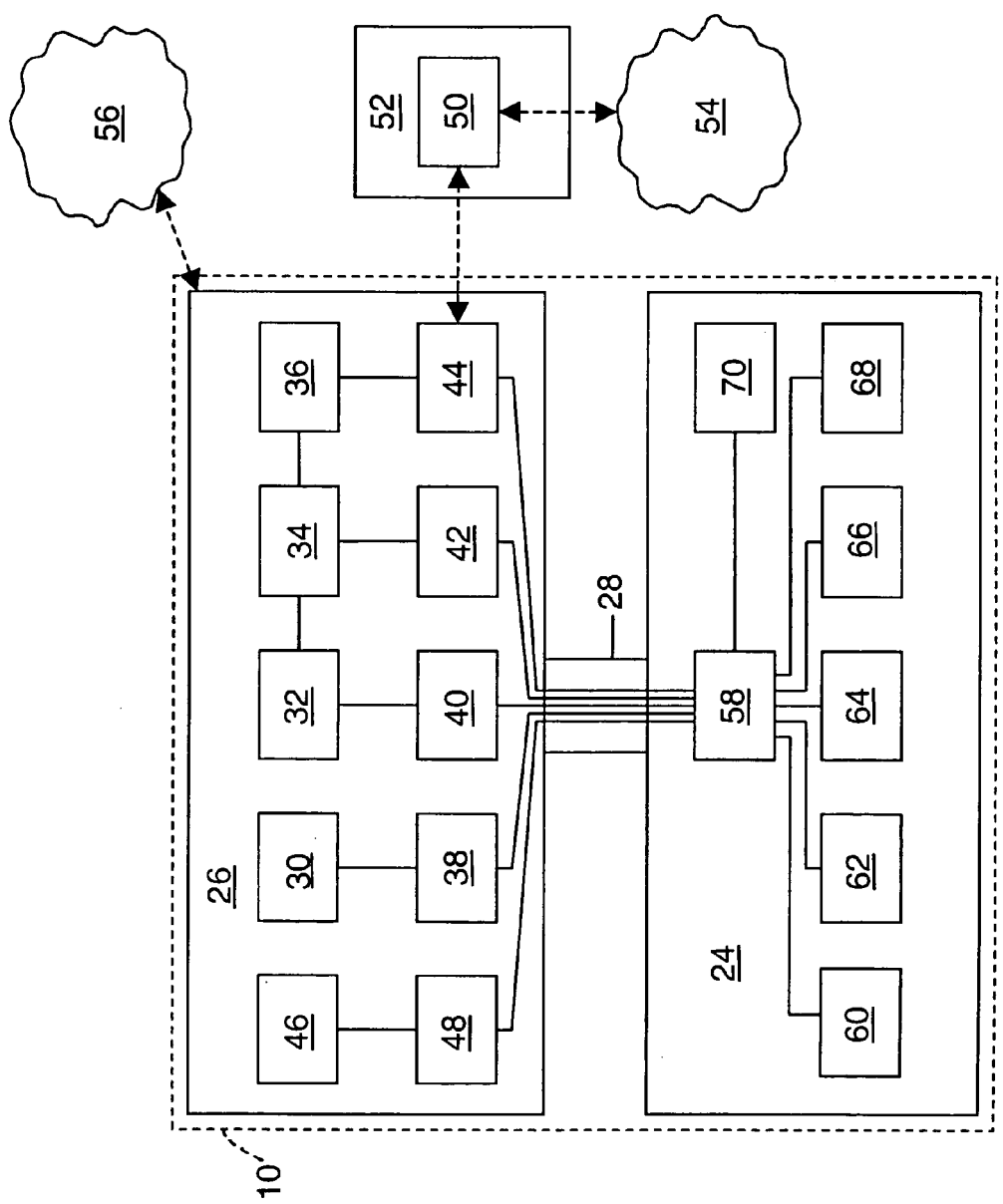
FIG. 2 shows parts of the device of FIG. 1 in greater detail.

FIG. 2 shows parts of the terminal of FIG. 1 in greater detail. Contained within the mobile terminal 10 are software and interfaces for controlling the terminal so as to obtain access to relevant services. These are shown collectively by the numeral 26. They are in the mobile terminal 10 itself rather than on the SIM card 24. Since the SIM card 24 needs to be used in the operation of the mobile terminal 10, for example to provide data and to perform calculations and verifications, the software and interfaces 26 and the SIM card 24 are connected by a logical connection 28. FIG. 2 shows information exchange between corresponding functional blocks, for example application interfaces and the applications themselves. The software and interfaces 26 communicate over a suitable protocol such as T1.

Included within the software and interfaces 26 are cellular software programs 30, 32, 34 and 36 which receive input from a user of the mobile terminal 10, interact with the SIM card 24 and control communication with telecommunications and other networks. The cellular software programs 30, 32, 34 and 36 communicate with corresponding applications on the SIM card 24 via application program interfaces (APIs) 38, 40, 42 and 44. For example co-operation between the cellular software programs and their corresponding applications could enable the user to have access to a telecommunications network providing Universal Mobile Telecommunications System (UMTS) services, GSM services or WAP services. The terminal could include other programs to provide other services such as electronic money.

Provided among the software and interfaces 26 is software 46 and an application program interface 48 to enable the user to use a profile selection application (PSA) 60 which is located on the SIM card 24. The PSA will be described in the following. The programs used to provide GSM and WAP services, for example programs 32 and 36, may have access to an electronic money application on the SIM card 24 via an electronic money program and an application program interface 34 and 42 respectively. The electronic money application interface 42 is connected via an HTTP protocol stack 50 in an external computer 52 to the Internet 54. In other embodiments of the invention the mobile terminal may comprise a combined computer and mobile telephone which is able to communicate to the Internet directly.

WAP services could be presented to the user in the form of a browser so that the user can readily obtain content from Internet servers and elsewhere.

As shown in FIG. 2 conventional telephony can occur via a telecommunications network 56.

The SIM card 24 contains a file structure in which a master file 58 contains a number of applications, the PSA 60 referred to above, telecommunications applications such as UMTS 62, GSM 64 and WAP 68 and an electronic money application 66. The cellular software programs use the applications to perform the various services provided by the mobile terminal 10, for example registering with the network, setting up a call, carrying out encryption and conducting financial transactions. There is also a directory file 70 which is described below.

Figure 3:
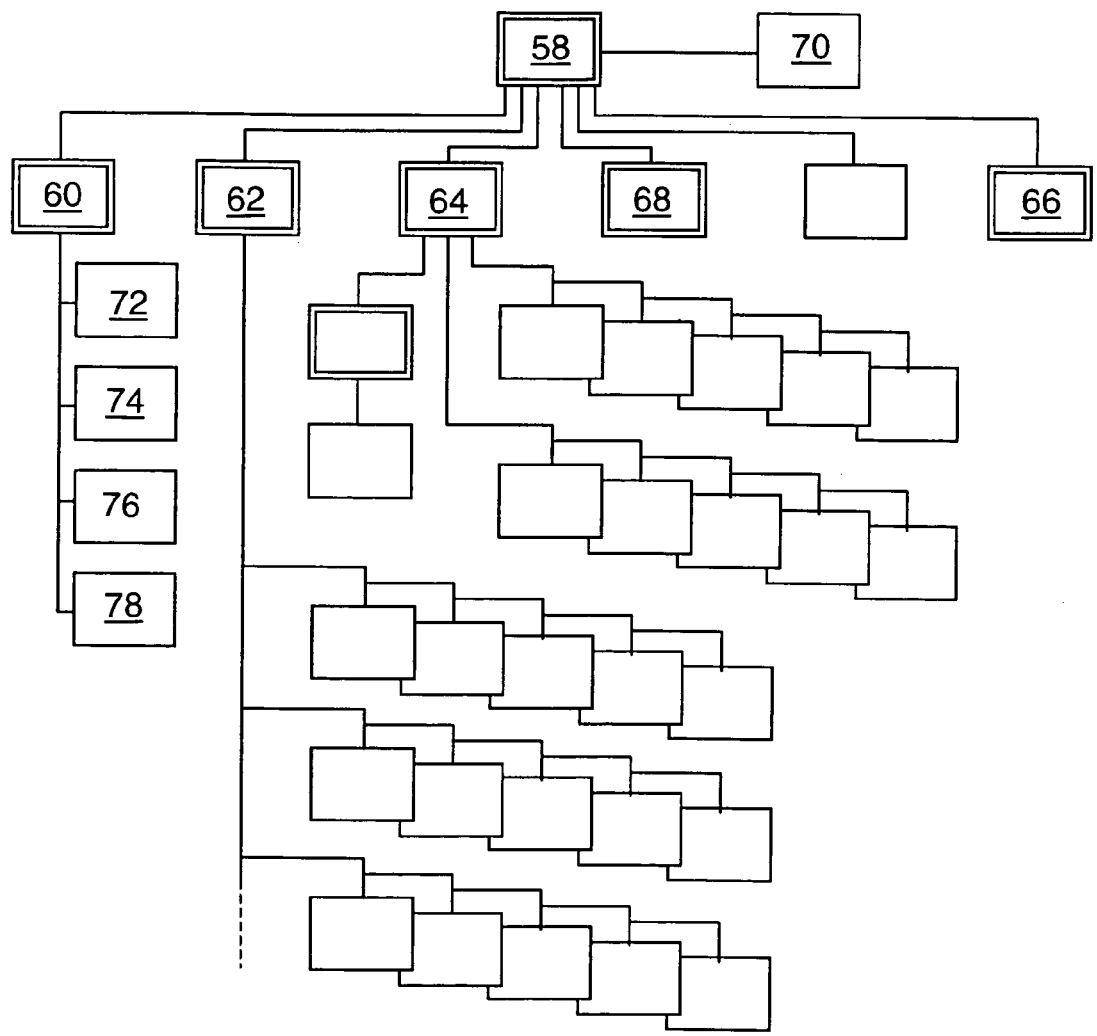
FIG. 3 shows a complete file structure.

The file structure present in the SIM card 24 is shown in greater detail in FIG. 3. This comprises the master file 58 containing the applications. The applications comprise a number of dedicated files and elementary files. A dedicated (DF) file is a file which contains control information and, optionally, memory available for allocation. It may be the parent of elementary files and other dedicated files. An elementary file (EF) is a set a data units or records which share the same file identifier. It cannot be a parent of another file. In the Figure EFs are shown as single boxes and DFs are shown as double boxes. For the sake of simplicity the complete set of EFs and DFs are not shown for certain applications and other applications have no internal file structure present at all, although one will almost certainly be present.

The master file 58 is a unique dedicated file representing the root of the file structure. Associated with the master file 58 is an EF referred to as a directory file (DIR) 70. The DIR 70 contains a list of applications supported by the SIM card 24 and optional related data elements for application identification. These include the application identifier (AID), the application label, the path to a file, commands to perform (defined and described in ISO/IEC standards), discretionary data and the application template. The data elements are coded by abstract syntax notation 1 (ASN.1) which is described and defined in ISO standards. The DIR and its contents are defined and described in ISO/IEC standards. The DIR 70 is used by the master file 58 to enable the mobile terminal to use the applications in the SIM card 24. The mobile terminal needs to use the ASN.1 coded information is the DIR 70 to obtain access to the applications.

As mentioned above, the PSA 60 is used to control access to the applications on the SIM card 24. The PSA 60 is a DF containing a number of EFs 72, 74, 76 and 78 relating to separate application profiles. A profile is a defined set of application programs which are available for use by the mobile terminal 10 or its user. A profile may comprise a single application program, or some or all of the application programs available on the SIM card 24. If a profile is successfully accessed all of the application programs within it may be accessed.

Each of the EFs within the PSA 60 relates to a separate profile and comprises a card holder verification (CHV) routine which needs to be successfully completed before access to the applications within the profile is allowed.

A number of different profile configurations are possible. The following table sets out a number of such configurations:

| Profile number | 1 | 2 | 3 | 4 | 5 | 6 | 7 | 8 |
|---|---|---|---|---|---|---|---|---|
| GSM |   | x |   | x |   |   |   | x |
| WAP |   | x |   | x |   | x | x | x |

-continued

| Profile number | 1 | 2 | 3 | 4 | 5 | 6 | 7 | 8 |
|---|---|---|---|---|---|---|---|---|
| e-money | x |   |   |   |   | x |   | x |
| UMTS1 | x |   |   |   |   | x |   | x |
| UMTS2 |   | x |   |   | x |   |   | x |
| PSA | x | x | x | x | x | x | x | x |
| Last selected application flag |   | x |   |   |   |   |   |   |
| Profile modification allowed |   |   |   |   |   |   |   | x |

Profiles 1 to 7 are user profiles permitting a user access to particular application programs. Several points should be noted about this table. The first point is that all the profiles contain the PSA 60. The second point is that profile 8 allows access to all applications and also is able to modify the profiles. Someone having access to profile 8 can change the applications to which the other profiles have access. For example, profile 6 could be modified to also allow access to the GSM application. Profile 8 may be a profile accessible by a service provider or the owner of or entity responsible for the mobile terminal 10. The third point is that there is a flag indicating which was the most recently selected profile.

Figure 4:
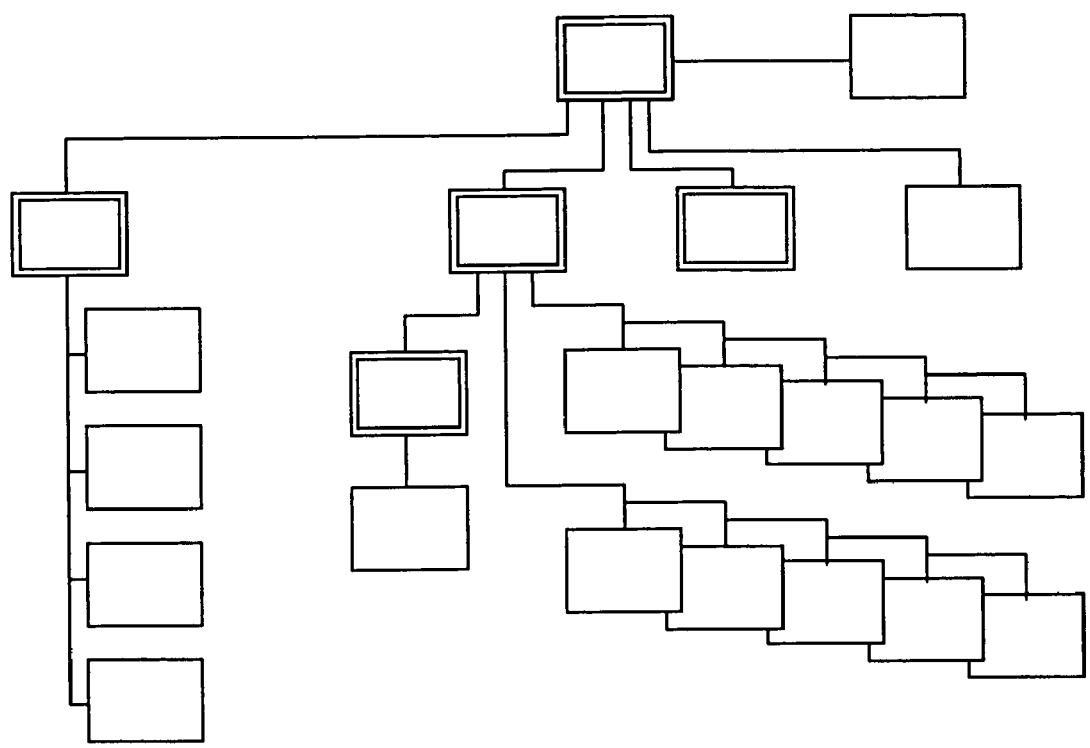
FIG. 4 shows a selected file structure.

As is described above, access to the application is determined through the list of applications supported by the SIM card 24 and data elements for application identification and selection. The SIM card 24 controls the contents of the DIR 70 to correspond with the applications which are accessible in a particular profile. For example, if profile 2 has been selected, the DIR file will only contain the AIDs for UMTS2 and PSA, and if profile 6 is selected, the DIR file will only contain the AIDs for WAP, e-money, UMTS1 and PSA. The effect of this is presented schematically in FIG. 4. If FIGS. 3 and 4 are compared it can be seen that some of the applications seem to have disappeared. This is because relevant data elements for their identification and selection have been made inaccessible in the DIR 70. This would be, for example, the AIDs of the "disappeared" applications. The underlying file structure has not been modified, it is just that certain parts of it are now no longer accessible through the DIR 70. As a consequence, certain application programs can be hidden and not be available to the user or to the mobile terminal 24.

In the file structure of FIG. 3, certain of the EFs may be suitable for use by more than one application. This may be the case for telephone applications. For example, this could be an EF containing a telephone directory or containing an IMSI. In order for these to be common EFs, they need to be made available to a DF of another application. They can be accessed by another DF by providing links or shortcuts in the smart card's operating system.

It will be appreciated that as profiles are changed, the DIR 70 needs to be updated with new information, for example data elements for application identification and selection, which have previously been removed from that part of the DIR 70 which can be read by the mobile terminal 10. Therefore a memory location is provided on the SIM card 24 which has the relevant data for all of the applications on the SIM card 24. This can be an additional EF associated with and only accessible from the DIR 70. When CHV is successfully completed for a profile, the DIR 70 is updated with data so as to make available all of the applications in that profile.

In one embodiment of the invention, a mobile terminal is to be used by a number of different users. Each of the users has a PIN code which allows access to a particular profile but not to other profiles. When the mobile terminal is switched on, it requests a PIN code and the user inputs his own PIN code. If the PSA is not visible to the user, the SIM card 24 identifies the profile to which the PIN code applies and carries out a card holder verification procedure. Once this is complete, the user is allowed access to the appropriate profile. It should be noted that the user interface appears to be normal and the user is not necessarily aware that profile selection has occurred or can occur. In an alternative embodiment, the PSA can be accessed by the user through a selection menu in the display 12 and profile selection can be a step which the user knowingly carries out. Of course, the user can only change the profile selection if he knows the correct PIN codes.

Figure 5:
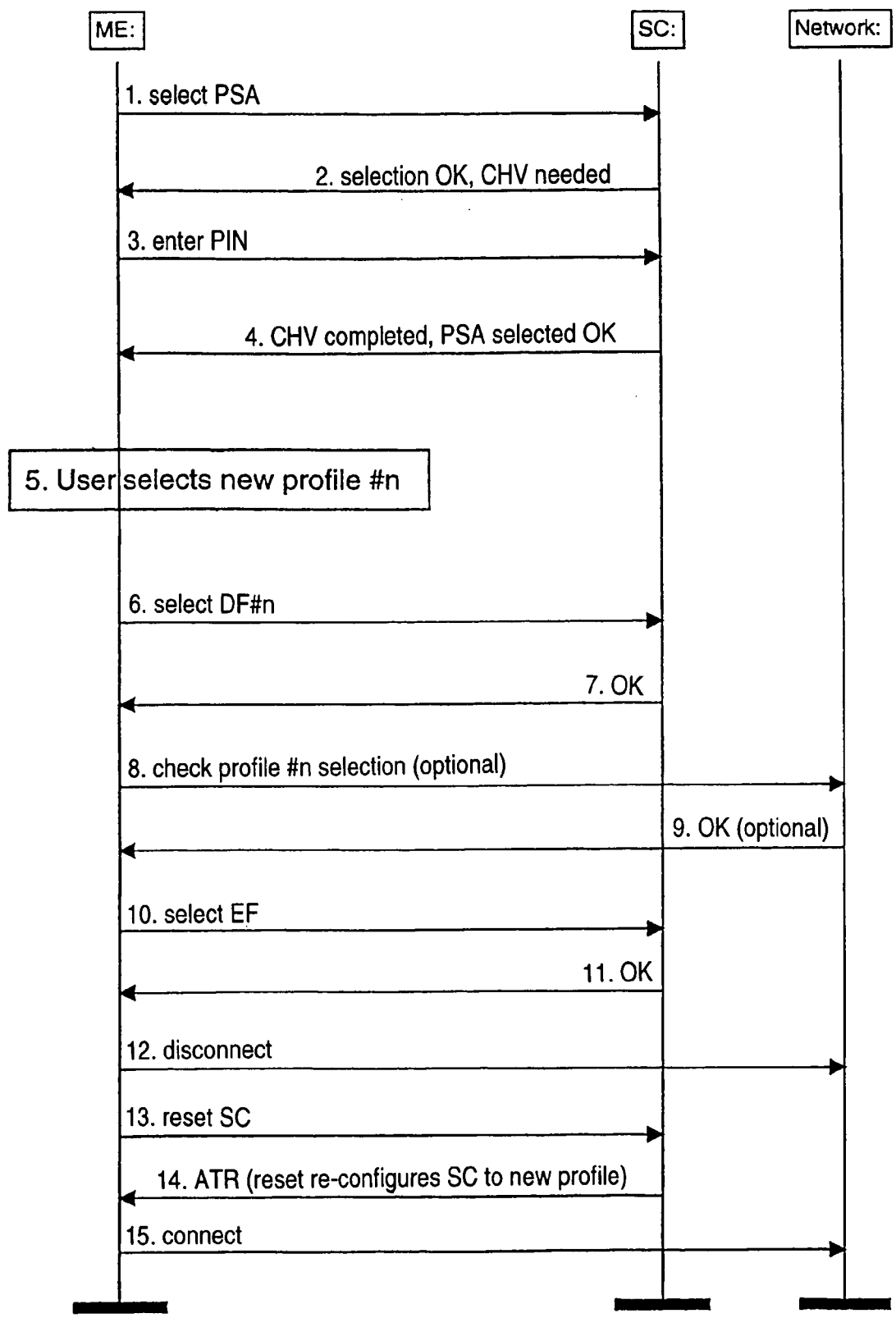
FIG. 5 shows a procedure for selecting a particular file structure.

Steps involved in the selection of a particular profile are described with reference to FIG. 5. This shows the actions taken by, and the messages sent between, the user, the SIM card 24 and the network.

The mobile terminal is switched on and it selects the PSA 60 from the SIM card 24 in accordance with ISO/IEC 7816-5. Once selection of the PSA 60 has occurred, the user enters a PIN code and CHV is carried out by the mobile terminal 10 in accordance with ISO/IEC 7816-4. Once CHV has been carried out successfully and the PSA is selected and usable by the user, the user can select a particular profile. It is irrelevant whether the user knowingly or unknowingly selects a particular profile since the transactions carried out between the mobile terminal and the SIM card are still the same. However, for the purposes of this part of the description it is assumed that the user knowingly selects a particular profile.

Having obtained access to the PSA 60, the user selects a particular profile, typically from a menu, which causes the mobile terminal to select the appropriate new profile. Although in this embodiment of the invention, the user is then able to have access to the application programs within a particular profile, in another embodiment, further CHV procedures are required to obtain final access to each application program individually.

In one embodiment, the mobile terminal transmits an identifier of the new profile to the network for synchronisation purposes between the mobile terminal and the network. In this embodiment, the network signals back to indicate whether the profile selection is allowed and correct.

The mobile terminal selects the appropriate profile EF thus completing the mobile selection procedure.

To put the applications into use, the mobile terminal terminates its connection to the network, and resets the SIM card. The SIM card responds with an answer to reset (ATR) and then the mobile terminal re-establishes its connection with the network.

When a new profile is selected, the DIR 70 is up-dated so that it only shows the AIDs corresponding to those application programs of the selected profile. It is not necessary to modify the existing SIM interface of the mobile terminal.

In an alternative embodiment there can be a common profile selection EF where desired user profile number is written. This method does not enable different CHV for profile selection and configuration. This embodiment can be arranged by having new C-APDU definitions.

Configuration of the profiles and access to them may be editable by the SIM card 24 supplier, its owner or an entity otherwise responsible for the SIM card 24, such as a service provider. This allows an entity other than the user to add or remove application programs to and from the profiles. Such an editable feature may be accessible through a CHV other than that of the user.

In the preceding description, the communications terminal is a mobile terminal. However, in other embodiments it could be a stationary communication device such as a terminal in a network. Of course, in such a use the invention may be embodied in a smart card (or smart device) other than a SIM card.

Of course, the skilled person will understand that the invention can be applied to devices other than communication devices.

It should be understood that although the invention has been defined and described in terms of apparatus, it can equally be considered to be a method.

While preferred embodiments of the invention have been shown and described, it will be understood that such embodiments are described by way of example only. Numerous variations, changes and substitutions will occur to those skilled in the art without departing from the scope of the present invention. In one embodiment, application selection occurs other than through a directory file (DIR). Direct application selection may be performed by the use of the SELECT FILE command in which the AID is specified as the dedicated file name. If direct selection is provided, then the mobile terminal may explicitly select an application to be performed without previously checking that the relevant application is present on the SIM card 24. If it is not present, the SIM card will reject the command. If it is present, the SIM card will execute the command. If direct selection is used, the file address is built into the mobile terminal. Accordingly, it is intended that the following claims cover all such variations as fall within the spirit and scope of the invention.

What is claimed is:

1. A smart card containing a plurality of application programs the application programs being grouped into a plurality of application program groups and group selection means being provided on the smart card to determine the application program groups to which a user is permitted access and the application program groups to which the user is not permitted access.

2. A smart card according to claim 1 in which the selection means is an application program.

3. A smart card according to claim 1 in which the selection means enables a user to have access to the application programs of at least one particular application program group and not to the application programs of at least one other particular application program group.

4. A smart card according to claim 1 in which certain users or certain classes of users may have access to all of the application program groups.

5. A smart card according to claim 1 in which the application program groups have a degree of overlap with at least one particular application program being contained in more than one application program group.

6. A smart card according to claim 1 which is insertable into and removable from a communications terminal.

7. A smart card according to claim 1 configured to hide at least one application program from the user if the user does not have a particular level of authorization.

8. A smart card according to claim 1 which is a subscriber identity module.

9. A smart card according to claim 1 which comprises a directory which is updated when a user selects a particular application program group.

10. A smart card according to claim 9 in which the directory is updated to contain identifiers of application programs in a most recently selected application program group.

11. A controlling application program for controlling a smart card containing a plurality of controlled application programs, the controlled application programs being grouped into a plurality of application program groups and the controlling application program comprising means for controlling the smart card to determine the application program groups to which a user is permitted access and the application program groups to which the user is not permitted access.

12. A controlling application program according to claim 11, in which the smart card is a subscriber identity module.

13. A controlling application program according to claim 11, arranged to hide at least one controlled application program from the user if the user does not have a particular level of authorization.

14. A controlling application program according to claim 11, arranged to allow the user access to the controlled application programs of at least one particular application program group and not to allow the user access to the controlled application programs of at least one other particular application program group.

15. A controlling application program according to claim 11, arranged to allow certain users or certain classes of users access to all of the application program groups.

16. A controlling application program according to claim 11, arranged to update a directory when a user selects a particular application program group.

17. A controlling application program according to claim 16, arranged to update the directory to contain identifiers of controlled application programs in a most recently selected application program group.

18. A communications terminal comprising a smart card, the smart card containing a plurality of application programs, the application programs being grouped into a plurality of application program groups and group selection means being provided on the smart card to determine the application program groups to which a user is permitted access and the application program groups to which the user is not permitted access.

19. A communications terminal according to claim 18 which is a mobile communications terminal.

20. A communications terminal according to claim 19 comprising a cellular telephone.

21. A communications terminal according to claim 18, in which the smart card is a subscriber identity module.

22. A communications terminal according to claim 18 in which the selection means provided on the smart card is an application program.

23. A method of selecting an application program group from a smart card containing a plurality of application programs, the method comprising:

grouping the application programs into a plurality of application program groups;

carrying out a verification procedure to determine the application program groups to which a user is permitted access and the application program groups to which the use is not permitted to access; and permitting the user access to the permitted application program groups and not permitting the user access to the non-permitted application program groups.

24. A method according to claim 23 comprising hiding at least one application program from the user if the user does not have particular level of authorization.

25. A method according to claim 23, in which the verification procedure is carried out by an application program.

26. A method according to claim 23 in which the user is permitted access to the application programs of at least one particular application program group and not to the application programs of at least one other particular application program group.

27. A method according to claim 23 in which certain users or certain classes of users may have access to all of the application program groups.

28. A method according to claim 23, in which the application program groups have a degree of overlap, with at least one particular application program being contained in more than one application program group.

29. A method according to claim 23, in which the smart card is insertable into and removable from a communications terminal.

30. A method according to claim 23, in which the smart card is a subscriber identity module.

31. A method according to claim 23, comprising updating a directory when a user selects a particular application program group.

32. A method according to claim 31, comprising updating the directory to contain identifiers of application programs in a most recently selected application program group.

* * * * *